W. G. & H. T. DOUGLAS & J. M. REED.
Seed Separator.
No. 110,124. Patented Dec. 13, 1870.
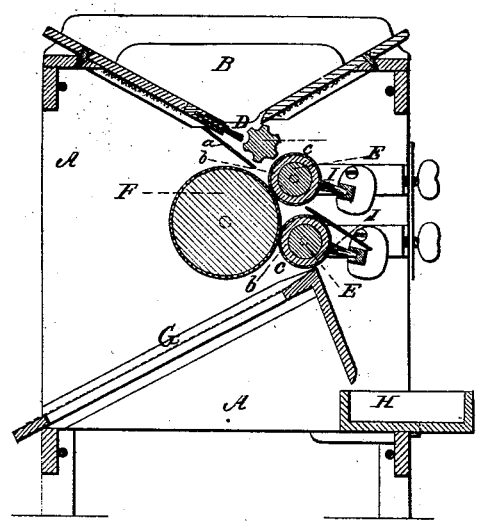
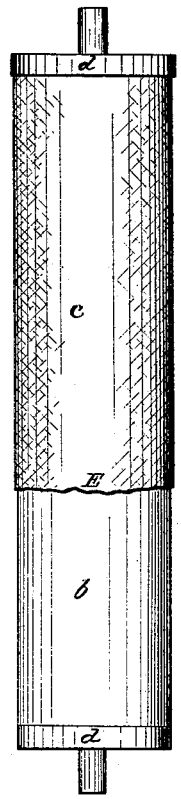
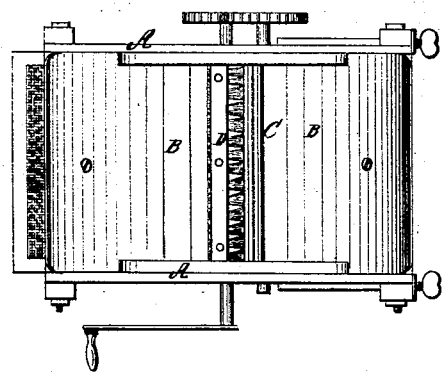
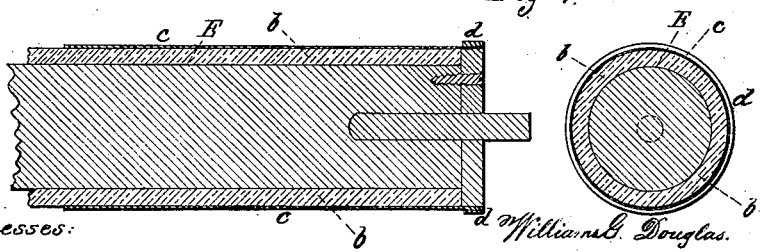

UNITED STATES PATENT OFFICE.

WILLIAM G. DOUGLAS AND HUGH T. DOUGLAS, OF WARRENTON, VIRGINIA, AND JOHN MILTON REED, OF OMAHA, NEBRASKA.

IMPROVEMENT IN MACHINES FOR SEPARATING COCKLE FROM WHEAT.

Specification forming part of Letters Patent No. 110,124, dated December 13, 1870.

*To all whom it may concern:*

Be it known that we, WILLIAM G. DOUGLAS and HUGH THOMAS DOUGLAS, of Warrenton, in the county of Fauquier and State of Virginia, and JOHN MILTON REED, formerly of Fauquier county, in the State aforesaid, but now of Omaha, in the county of Douglass and State of Nebraska, have invented certain new and useful Inprovements in Machines for Separating Cockle from Wheat; and we do hereby declare that the following is a full, clear, and exact description thereof, reference being had to the accompanying drawings of the same, which make part of this specification, and in which—

Figure 1 represents a vertical section of a machine embracing our improvements. Fig. 2 represents a top view of the same. Fig. 3 represents a view of one of the separating-rollers, showing a portion of the linen adhesive covering removed; and Fig. 4 represents a longitudinal and transverse section of the same.

Our invention relates to machines for separating cockle from wheat; and its object is to render such separation as perfect and rapid as possible.

In the accompanying drawings, the frame A of the machine is made of any suitable form and dimensions, having a hopper, B, arranged at its top, the mouth of which is equal in length to the feeding-roller. This roller C is fluted, and is placed within and parallel to the mouth of the hopper, in contact with a brush, D, and with it forms the bottom of said hopper. The grain, therefore, cannot feed through the hopper except as it gathers in the flutes of the roller to pass the brush, and as the latter only sweeps the ribs of the roller, the feed of the grain from the hopper will be in separate and distinct parcels, equal in length to the roller, and in quantities corresponding to the depth of the flutes thereof. This method of delivering the grain greatly facilitates its separation from the cockle, because, being fed in strips, it will more readily spread out thinly and evenly.

The separating-rollers E E are arranged one below the other, just under the fluted roller C, and adjusted so as to be constantly in contact with a larger pressure-roller, F, covered with zinc or other suitable sheet metal.

Directly beneath the brush and fluted roller I arrange a thin flexible sheet of metal, *a*, to receive the grain and direct it between the rollers. The contact of the grain upon this thin strip will cause it to tremble, or have a slight vertical shaking motion, and the grain, moreover, will be caused to rebound as it strikes the sheet metal, and will be thus more evenly and thinly delivered to the rollers. The grain, when separated, is delivered at the front by an inclined trough or screen, G, and the cockle is delivered from the rollers into a receiver, H, at the rear of the machine by means of stiff brushes I I, arranged to bear against the rear side of the surface of the separating-rollers.

Our improvements relate more particularly to the devices for feeding the grain to the separating-rollers, and to the construction of these rollers, so as render them effectual for the purpose, and more durable than heretofore made.

Separating-rollers made of composition rubber to form a yielding adhesive surface have been found to wear in holes very rapidly, and to become irregular throughout its surface; also, to be injuriously affected by heat and cold, the former rendering it too soft, and the latter hardening and cracking it; and, moreover, is subject to destruction by rats. To remedy these difficulties felt or cloth has been used as a covering instead of gum; but this has been found objectionable, because as soon as the nap of the felt has been worn off, the surface becomes smooth and the cockle will not adhere to it, but will drop off, and passes out with the wheat. The rollers must, therefore, be thrown away, or the felted covering renewed, with much trouble.

In our improved rollers we use the composition gum as an elastic bed, *b*, and cover it with linen or duck fabric *c*, having no nap or fiber. This linen fabric is secured to the elastic bed *b* by a coating of rubber cement, to which it adheres, so as to prevent it from rolling up in ridges or wrinkles while holding the cockle in carrying it between the rollers. The outer surface of the linen fabric is also well covered with a thin coating of rubber cement to produce an adhesive surface that takes hold of and retains the cockle by reason of its jagged and rough skin, when pressed against it, while the wheat, on account of its smooth, hard rind and gravity, will pass between and drop from the rollers, instead of adhering to them. When the adhesive cement has worn off, it is readily and easily restored by simply recementing the surface of the linen, and in this way the rollers can be renewed and used effectually for a long time.

Another important advantage in the use of the linen covering in connection with the inner and outer coating of rubber cement is that it preserves the composition gum from the effects of heat and cold by entirely insulating it, and also prevents it from being eaten by rats.

To prevent the curling up of the linen adhesive covering $c$ at the ends of the rollers E, it is wrapped by leather bands $d$, riveted to the heads of said rollers, and while serving thus to secure the linen fabric $c$, these bands $d$ also form collars at the ends of the rollers, to prevent the grain from passing off between the sides of the machine and the ends of the rollers.

The pressure and fluted rollers F and C are geared together, so as to revolve toward each other with equal speed, and the separating-rollers E receive their motion by contact with the pressure-roller F, so that the grain must pass between them, and in doing so the cockle will adhere to the cemented surface $c$ of the rollers E, be carried back and swept off by the brushes I, while the grain passes out in another direction without hinderance.

The journals of the separating-rollers are carried by slides, which allow them to be adjusted against the pressure-roller as may be desired, and the brushes can also be adjusted with the proper pressure to detach the cockle from the separating-rollers.

Having described our invention, we claim—

1. The combination of a cotton or linen covering with a gum or other yeilding roller or rollers, when the former is prepared and applied to said yielding surface as herein described, and for the purposes specified.

2. The cotton or linen covering for cockle-separating rollers, coated with rubber cement, for producing an adhesive separating-surface to said covering, as herein set forth.

3. The separating-rollers E, provided with the covering $c$ and grain-guards $d$, as described.

4. The combination of the cockle-rollers E, constructed substantially as described, with the fluted feeding-roller C, pressure-roller F, stripping-brushes D, and thin flexible or tremulous sheet-metal conductor $a$, for the purpose herein set forth.

In testimony whereof we have hereunto set our hands.

WM. G. DOUGLAS.
  HUGH THOS. DOUGLAS.
  J. M. REED.

Witnesses to the signature of Wm. G. and Hugh T. Douglas:
  A. E. MANYETT,
  JOHN N. GRANT.

Witnesses to the signature of J. Milton Reed:
  JONATHAN EWERS,
  W. R. BULLARD.